No. 656,684. Patented Aug. 28, 1900.
D. WILEY.
STEAM HEATER.
(Application filed May 28, 1897.)
(No Model.)
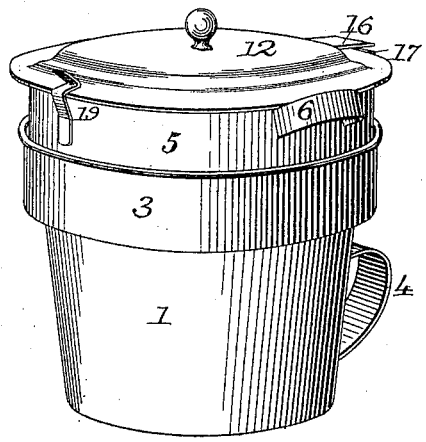
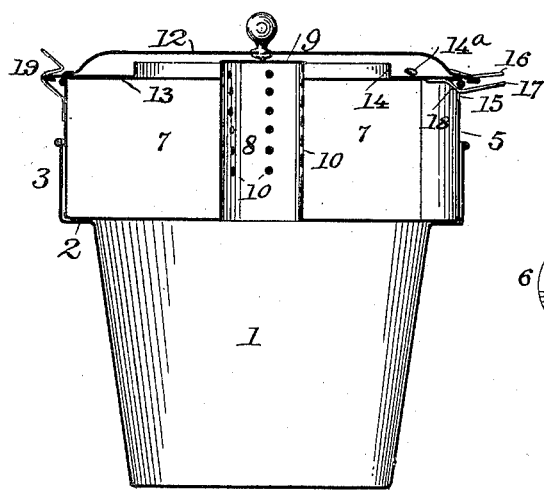
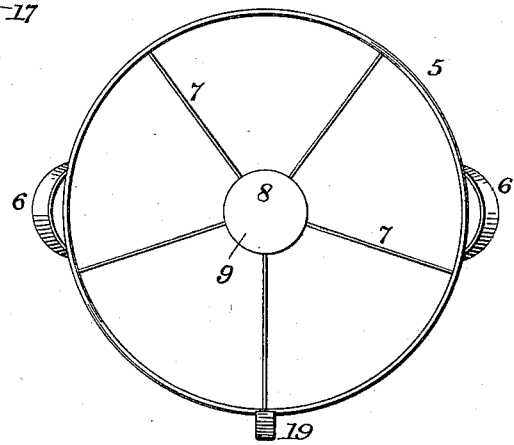
Witnesses;
Inventor;
DORA WILEY
By John Wedderburn.
Attorney.
THE NORRIS PETERS CO., PHOTO-LITHO., WASHINGTON, D. C.

UNITED STATES PATENT OFFICE.

DORA WILEY, OF DUBLIN, TEXAS.

STEAM-HEATER.

SPECIFICATION forming part of Letters Patent No. 656,684, dated August 28, 1900.

Application filed May 28, 1897. Serial No. 638,599. (No model.)

*To all whom it may concern:*

Be it known that I, DORA WILEY, of Dublin, in the county of Erath and State of Texas, have invented certain new and useful Improvements in Steam-Heaters; and I do hereby declare the following to be a full, clear, and exact description of the invention, such as will enable others skilled in the art to which it appertains to make and use the same.

This invention relates to steam-heaters for articles of food; and it consists, essentially, of a vessel divided into a series of compartments by radially-arranged partitions extending from a centrally-disposed tube which is closed at top and open at the bottom and having perforations therein leading to each of the compartments, together with a specific form of cover and other incidental attachments.

The invention further consists of the details of construction and arrangement of the several parts, which will be more fully hereinafter described and claimed.

The object of the invention is to provide a simple and inexpensive steamer for the use and convenience of small hotels, boarding-houses, and restaurants that cannot afford the expensive steaming apparatus usually employed in large hotels and wherein different articles of food may be placed in separate compartments and kept warm and fresh without injuring the flavor and dished therefrom as used.

In the accompanying drawings, Figure 1 is a perspective view of a steamer embodying the invention. Fig. 2 is a central longitudinal vertical section of the same. Fig. 3 is a top plan view of the holding vessel, showing the arrangement of the compartments therein, the cover or lid being detached.

Referring to the drawings, wherein similar numerals of reference are employed to indicate corresponding parts in the several views, the numeral 1 designates a hot-water-containing vessel of any suitable dimension, but preferably tapered toward its lower end to reduce the space occupied on a stove or range and having at the top a horizontal flange 2, with an outer upturned edge 3, said flange being located at such an elevation as to permit the seating of a vessel therein and bring the bottom of the said vessel in contact with the hot water in the vessel 1. At one side of the said hot-water-containing vessel 1 is a handle 4, by the use of which the contents may be poured out or for any other purpose desired. A preferred form of device is removably seated on the flange 2, and consists of a steamer 5 of a suitable size and preferably cylindrical in form and having opposite handles or grips 6. Within the said steamer 5 are a series of radially-arranged partitions 7, which extend from a central tube 8, having an upper closed end 9 and its lower end open and extending through the bottom of the said steamer. The upper end of the tube 8 projects slightly above the upper edge of the steamer 5 in the said tube at points exposed. Within the compartments formed by the partitions 7 a series of apertures 10 are formed, which extend partially downward from the top thereof, but not entirely to the bottom, the distance that the said apertures 10 are from the bottom of the steamer 5 being regulated by the size of said steamer. A lid or cover is applied to the steamer 5, and consists of an outer struck-up top 12, with an annular flange 13 applied to the inner side thereof in a horizontal plane to form a space between the same and the said top. The inner edge of the flange 3 is turned upwardly, as at 14, and forms a trough or channel in which condensed steam or moisture congregates and is prevented from dropping onto the food contained in the several compartments. An aperture 14' is formed in one side of the lid or cover to pour the water of condensation therefrom. The upwardly-projecting end of the tube 8 extends into the lid or cover, and the latter firmly closes down over the top of the steamer.

The operation of the device thus far described is simple, and in arranging it for use the hot-water-containing vessel 1 is filled with hot water and the steamer 5 is placed on the top thereof and rests on the flange, the bottom of the steamer contacting with the water in the said hot-water-containing vessel. The vessel 1 and the steamer 5 are then placed upon a stove or range, and the water becoming heated the steam gradually rises and passes up through the tube 8, being forced through the openings or apertures 10 into the several compartments formed by the partition 7, and finally strikes the inner side of the lid or cover, and the water of condensation is held within the flange and prevented from dripping therefrom, as previously set forth. A double heating effect is thus had through the medium of the hot water bearing against the bottom of the steamer 5 and also the steam which comes through the apertures or openings 10.

A preferred and convenient form of attachment for the lid or cover is provided, and consists in constructing a slot 15 in one side of the upper portion of the steamer 5 and in providing the lid or cover at one edge with an outwardly-extending tongue 16, which is slightly depressed, and having below the same a second tongue 17 with an angular bend 18. The tongues 16 and 17 are spaced apart, but slightly converge toward each other adjacent to the outer ends thereof, and in applying the lid or cover the one tongue 16 rests over the top of the rim of the steamer and the other tongue passes through the slot 15 until the rim is pressed inward into the angular bend 18, which forms a hinge-seat, by means of which the said lid or cover may be raised without entirely disconnecting it, and when it is raised a support is formed therefor by the tongue 17 bearing against the adjacent portion of the body of the steamer. When desired, the said lid or cover can be readily detached from the steamer and be cleansed or otherwise manipulated. On the opposite portion of the steamer-body is a suitable clasp 19, by which the lid or cover may be held closed.

The device hereinbefore set forth is exceptionally convenient in its use and is comparatively inexpensive in the cost of manufacture.

It is obviously apparent that many minor changes in the details of construction might be made and substituted for those shown and described without in the least departing from the nature or spirit of the invention.

Having thus described the invention, what is claimed as new is—

A steam-heater comprising a hot-water receptacle provided at an intermediate point in its height with a flange and seat, a steamer adapted to rest on said seat, a struck-up cover provided at its edge with an annular inwardly-extending flange, the inner edge of which is upturned to form an annular condensation-chamber, a central tube extending from the bottom of the steamer upward into the cover and arranged centrally of the condensation-chamber, and radial partitions extending from the tube to the outer wall of the steamer, the central tube being provided in its upper portion with openings leading to the compartments formed by the radial partitions, substantially as described.

In testimony whereof I have signed this specification in the presence of two subscribing witnesses.

DORA WILEY.

Witnesses:
 C. A. GARNER,
 JOHN PARKER.